United States Patent
Pruett

(10) Patent No.: US 7,827,646 B2
(45) Date of Patent: Nov. 9, 2010

(54) VORTEX INHIBITOR DISPERSAL PIG

(75) Inventor: Rick D. Pruett, Oologah, OK (US)

(73) Assignee: TDW Delaware, Inc., Wilmington, DE (US)

(*) Notice: Subject to any disclaimer, the term of this patent is extended or adjusted under 35 U.S.C. 154(b) by 352 days.

(21) Appl. No.: 12/028,078

(22) Filed: Feb. 8, 2008

(65) Prior Publication Data

US 2009/0199873 A1    Aug. 13, 2009

(51) Int. Cl.
*B08B 9/04* (2006.01)

(52) U.S. Cl. .............. 15/104.061; 15/104.05

(58) Field of Classification Search ........... 15/3.05, 15/104.061, 104.063, 104.05, 104.16
See application file for complete search history.

(56) References Cited

U.S. PATENT DOCUMENTS

| | | | |
|---|---|---|---|
| 3,209,988 A * | 10/1965 | Fox et al. ........... | 417/423.1 |
| 3,708,819 A * | 1/1973 | Breston ............... | 15/104.061 |
| 4,411,039 A | 10/1983 | Timmins et al. | |
| 4,425,385 A | 1/1984 | Coulter et al. | |
| 4,498,932 A | 2/1985 | Kruka | |
| 5,528,790 A * | 6/1996 | Curran ............... | 15/104.061 |
| 5,795,402 A * | 8/1998 | Hargett et al. ....... | 134/8 |
| 6,527,869 B1 | 3/2003 | Bourg | |
| 6,874,193 B2 | 4/2005 | Pruett | |

OTHER PUBLICATIONS

International Search Report and Written Opinion corresponding to PCT/US09/31543; issued by the International Searching Authority (ISA/US) on Mar. 9, 2009; 9 pages.

* cited by examiner

*Primary Examiner*—Michael Barr
*Assistant Examiner*—Saeed T Chaudhry
(74) *Attorney, Agent, or Firm*—Gable Gotwals

(57) ABSTRACT

A pipeline pig—that moves by pressurized gas flow and provides for distribution of treating liquid subsisting in a lower portion of a pipeline—having a longitudinally extending nozzle located at a forward end of the pig, an array of helical-shaped louvers located on the discharge side of the nozzle and arranged circumferentially, and two perforated sealing elements that create a cavity that serves as a low pressure plenum. The louvers create a vortex effect and the perforated sealing elements allow vapor and liquid in front of the pig to be drawn into the cavity and discharged through the ports and back into the discharge of the nozzle. In this manner, liquid subsisting at a bottom portion of the pipeline is dispersed to achieve a complete 360° coating application of the interior cylindrical wall of the pipeline.

17 Claims, 5 Drawing Sheets

VORTEX INHIBITOR DISPERSAL PIG

REFERENCE TO PENDING APPLICATIONS

This application is not based upon any pending domestic or international patent applications.

FIELD OF THE INVENTION

This invention relates generally to a pipeline pig that services a pipeline and moves through the interior of the pipeline by the flow of pressurized gas. More specifically, this invention relates to a pipeline pig that provides improved distribution of treating liquids, such as inhibitors and cleaning chemicals, subsisting in the lower portions of the pipeline.

BACKGROUND OF THE INVENTION

The invention described herein is a pipeline pig that provides a method of applying a treating fluid, such as an inhibitor or a cleaning chemical, within a pipeline to specific longitudinal and circumferential areas along the inner wall of the pipeline and particularly to the upper interior portions of the interior wall of a pipeline. Pipelines, particularly those designed to carry large volumes of gas under pressure, are customarily made of metal and usually of steel. Steel is the preferred metal for construction of a pipeline due to its inherent strength, availability, and economy. However, steel is subject to corrosion as a consequence of oxidation or reaction with gasses or liquids, such as water, that is commonly encountered when large volumes of gas are delivered through a pipeline.

To combat corrosion, a standard technique employed by many operators of pipelines is to periodically deposit inhibitor liquid within the pipeline. The liquid can be moved by the flow of gas through the pipeline or more commonly, by the use of pipeline pigs inserted into the pipeline and moved by the flow of gas. The pigs serve to provide a moving plunger within the pipeline that tends to sweep liquid within the pipeline before it and to therefore move the liquid through the full length of the pipeline. One method of applying a treating liquid to the interior of a pipeline is called "batching" in which treating liquid is captured between two pipeline pigs that move in tandem. Although this method is widely accepted and used it does not insure that the upper quadrant of the interior of a pipeline is adequately coated with or exposed to the treating liquid.

A second method of treating the interior cylindrical surface of a pipeline is called the "injection method." In this method, the treating liquid is injected directly into the pipeline and is moved by gas flow to carry the liquid through the length of the pipeline. This method is costly and usually requires that treating liquids be more or less continuously injected into the pipeline. There is no direct application, in this method, of the treating liquid to the inner wall because liquid simply condensates and rests on the bottom interior surface of the pipeline.

A third method of treating the interior cylindrical surface of a pipeline is called the "dispersion method," and is disclosed in my U.S. Pat. No. 6,874,193. In this method, a pipeline pig is positioned in a pipeline that has a treating fluid, and the pig is moved by gas flow through the pipeline. The pig is configured to move liquid forward in advance of the pig so that the liquid will be carried from one area to another within the pipeline. As the pig moves through the pipeline and pushes liquid along ahead of it, some of the pressurized gas from the rearward end of the pipeline pig flows through a rearward inlet, through the interior of the pig body, and out through a bypass passageway. The rearward inlet is preferably placed close to the interior bottom of the pipeline. The gas flow surrounds a siphon passageway and draws liquid within the lower interior portion of the pipeline into an inlet end of the siphon passageway. The application of a reduced pressure at the outer end of the siphon passageway draws liquid from within this siphon passageway and carries it with the gas so that a spray of liquid is formed and ejected from a nozzle opening to cover an upper interior segment of the pipeline interior cylindrical wall.

The shortcomings of the current dispersion method are (1) a large volume of bypass gas or liquid cannot flow through the pig body or nozzle, (2) discharge velocity and the mixing effect of the nozzle are limited by differential pressure, and (3) a plurality of nozzles is required in order to achieve direct top coating application. Therefore, there is a need for a dispersal apparatus that addresses these shortcomings and provides for improved dispersion and coating effect.

BRIEF SUMMARY OF THE INVENTION

A pipeline pig according to this invention is moved through the interior of a pipeline by the flow of pressurized gas and provides improved distribution of treating liquids, such as an inhibitor or a cleaning chemical, onto interior surfaces of the pipeline. The pipeline pig has a longitudinal pig body having a nozzle located at a forward end of the pig with a conical-shaped central opening and at least three external circumferential sealing elements located rearward of the nozzle. In a preferred embodiment, the first sealing element is cup-shaped and is perforated in at least two places to provide a passageway for liquid residing in a lower quadrant of the pipeline and ahead of the pig and a passageway for vapor residing in an upper quadrant of the pipeline and ahead of the pig. The second and third sealing elements have a radial disc shape, and the second sealing element is perforated in at least two places to provide a passageway for liquid and vapor moving past the perforated first sealing element.

Located within the nozzle is a longitudinally extending tapered cavity that shares a common centerline with the pig body. The nozzle has a venturi and a circumferential array of ports arranged around the apex of the venturi of the nozzle. The array of ports is in communication with an interior portion of the nozzle and a cavity external to the pig body that serves as a low pressure plenum. The cavity is defined by an exterior surface of the pig body, an interior surface of the pipeline, and opposing surfaces of the second and third sealing elements. In a preferred embodiment, the array of ports is located just forward of the discharge side of the nozzle. In another preferred embodiment, the array of ports is located rearward of the discharge side of the nozzle. In yet another preferred embodiment, only the first sealing element is perforated and the cavity serving as a low pressure plenum is located between this first sealing element and the second sealing element.

All the nozzle designs may further comprise a plurality of louvers—located forward of the discharge side of the nozzle cavity and arranged circumferentially—that preferably create a spiral helical shape. The helical shape created by the louvers increases the discharge velocity and mixing effect of the nozzle, thereby creating a vortex effect. In an application of the Bernoulli effect, the high velocity of pipeline product passing through the venturi creates a low pressure at the array of ports that is recognized in the cavity. The perforated first and second sealing elements allow vapor and liquid in front of the pig to be drawn into the cavity, through the ports, and back into the discharge of the nozzle. In this manner, liquid subsisting at a bottom portion of the pipeline is drawn into, vaporized, and dispersed through the nozzle to achieve a complete 360° coating application of the interior cylindrical wall of the pipeline.

A better understanding of the invention will be obtained from the following detailed description of the preferred embodiments taken in conjunction with the drawings and the attached claims.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENTS

It is to be understood that the invention that is now to be described is not limited in its application to the details of the construction and arrangement of the parts illustrated in the accompanying drawings. The invention is capable of other embodiments and of being practiced or carried out in a variety of ways. The phraseology and terminology employed herein are for purposes of description and not limitation.

Figure 1:
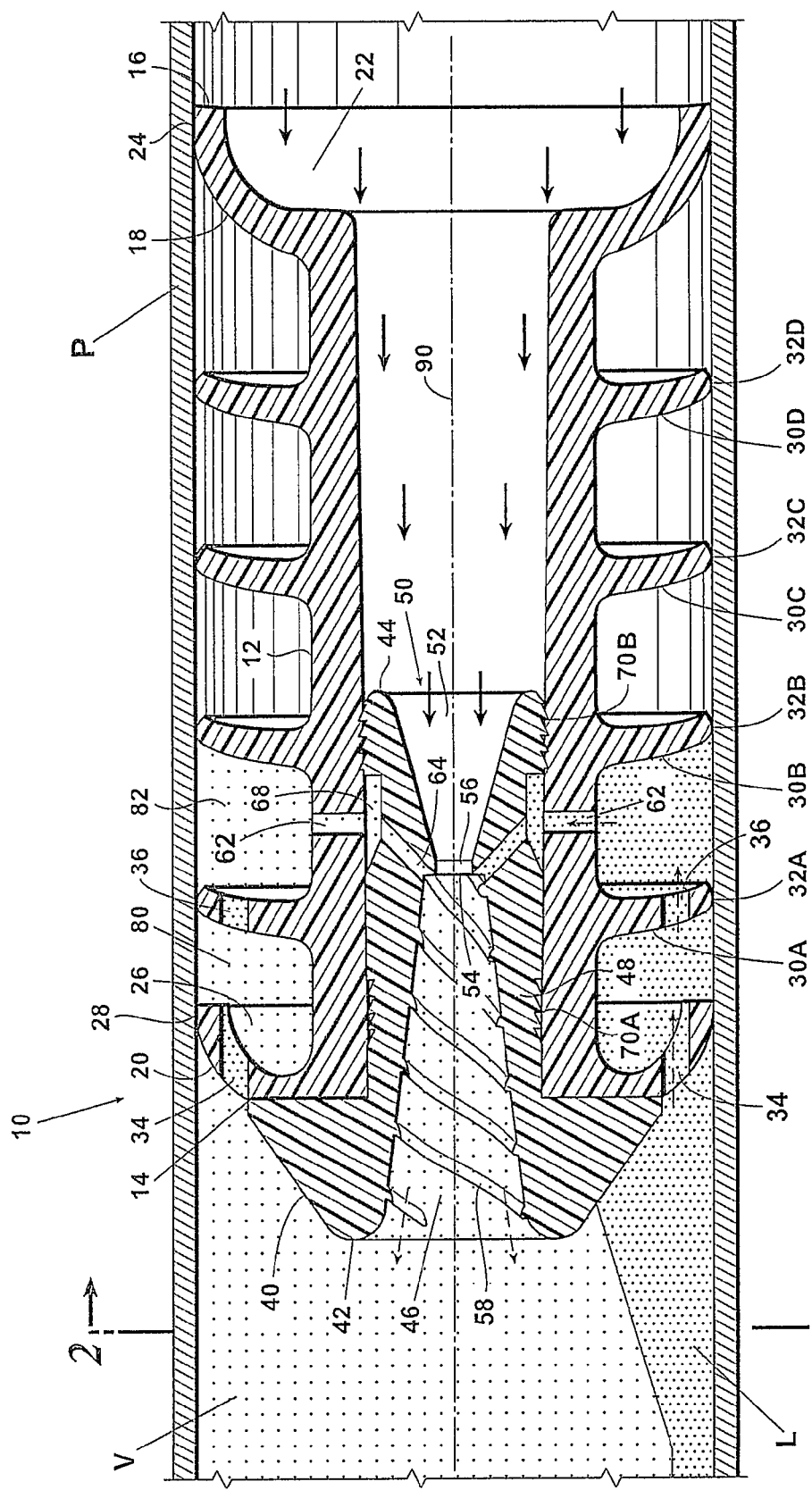
FIG. 1 is a cross-sectional view of a pipeline pig that encompasses the principles of this disclosure. The pipeline pig has an array of ports arranged circumferentially around a nozzle and located forward of a venturi, a set of perforated sealing elements, and a low pressure plenum.
Figure 2:
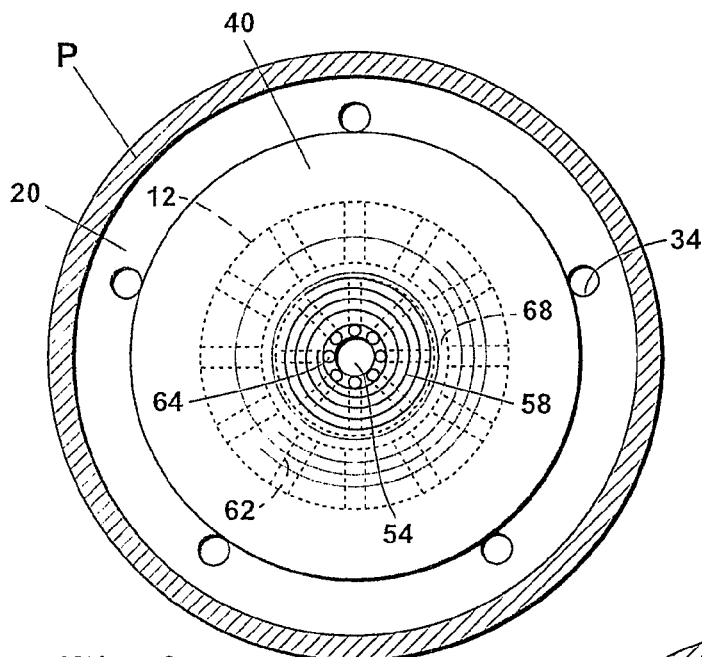
FIG. 2 is a view of the pipeline pig of FIG. 1 taken along section line 2-2.

Referring to the drawings, FIGS. 1 and 2 illustrate a pipeline pig 10 having a longitudinal, cylindrical body 12—preferably made of flexible urethane—located within a pipeline P. Body 12 has a forward end 14 and a rearward end 16. Positioned at rearward end 16 is a rearward cup 18 and, in like manner, positioned at forward end 14 is a forward cup 20. Cups 18 and 20 are preferably made of an elastomeric material; urethane is a commonly used material for pipeline pig cups. Rearward cup 18 has a circumferential cup-shaped recess 22 in the rearward surface that provides a flexible, circumferential lip portion 24 into sealing engagement with the interior cylindrical surface of pipeline P. Forward cup 20 is configured similar to rearward cup 18 and has a cup-shaped recess 26. Cup-shaped recess 26 provides a flexible, circumferential lip portion 28 that expands outwardly by the force of gas flow to engage the interior of pipeline P. The sealing engagement of the cups 18 and 20 allows pig 10 to be moved by fluid flow through pipeline P.

Positioned between forward cup 20 and rearward cup 18 is a set of radial disc seals 30a-d. The radial disc seals 30 can vary in number depending on pipeline service requirements and are preferably made of a tough elastomeric material. Each radial disc seal 30 has an outer circumferential edge 32 that engages the interior wall of pipeline P. This engagement provides a squeegee action that moves any fluid in pipeline P along with pig 10 as pig 10 is forced through pipeline P by gas flow.

Secured to the front of pig body 12 is a nozzle 40 having a forward end 42 and a rearward end 44. Nozzle 40 is preferably formed of a rigid material. Located within nozzle 40 and about a shared centerline 90 of pig body 12 is a conical-shaped discharge passageway 46. Passageway 46 tapers in diameter toward an apex or orifice 54 so that a diameter of passageway 46 at forward end 42 is substantially larger than that at orifice 54. Passageway 46 may further comprise an array of louvers 58 preferably having a spiral helical shape. To secure nozzle 40 to pig body 12, nozzle 40 has a central-reduced cylindrical portion 48 that is received by forward end 14 of pig body 12. A plurality of barbs 70A, 70B located on an external surface of nozzle 40 grip the inner surface of pig body 12 and hold nozzle 40 in place. A radially extended portion of nozzle 40 serves as a bumper to align, locate, and hold nozzle 40 in place.

Located at rearward end 44 of nozzle 40 is a conical-shaped inlet 50 that tapers down to a discharge orifice 54 and a venturi 56. Inlet 50, discharge orifice 54, and venturi 56 are located circumferentially about centerline 90. Helical-shaped louvers 58, located forward of discharge orifice 54, may be employed to create a vortex effect, working to enhance the discharge velocity and mixing effect of nozzle 40. The number, shape, and pitch of the louvers are application specific.

An array of ports 62, 64 is arranged circumferentially about pig body 12 and nozzle 40, respectively. Arrays 62 and 64 are in communication with one another through a circumferential space 68 formed by a recess in the body of nozzle 40 to serve as a low pressure plenum within pig body 12. The porting 62, 64, which is comprised of substantially equally spaced passageways, provide a low pressure area in space 68 that is developed by venturi 56 as bypass gas flows through orifice 54. The number, size, and configuration of passageways in each array 62, 64 will vary depending on pipeline pressure and flow. In one of the preferred embodiments, passageway 64 is located just forward of discharge orifice 54 and angles rearward and away from centerline 90. Passageway 64 then intersects space 68.

Figure 5:
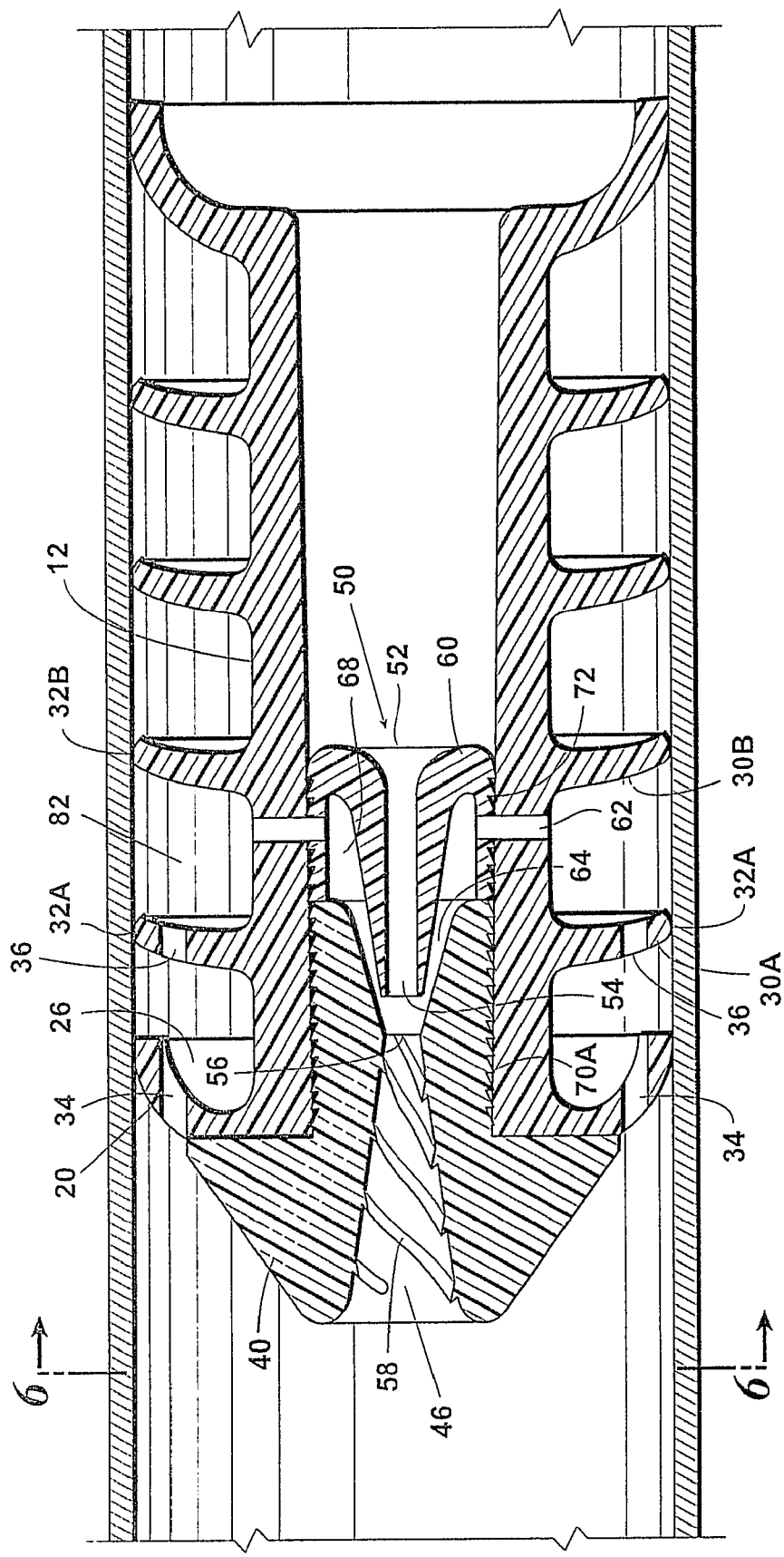
FIG. 5 is a cross-sectional view of the pipeline pig having the array of ports arranged circumferentially around a two-piece nozzle with helical louvers and located rearward of the venturi, and having a set of perforated sealing elements and a low pressure plenum.
Figure 7:
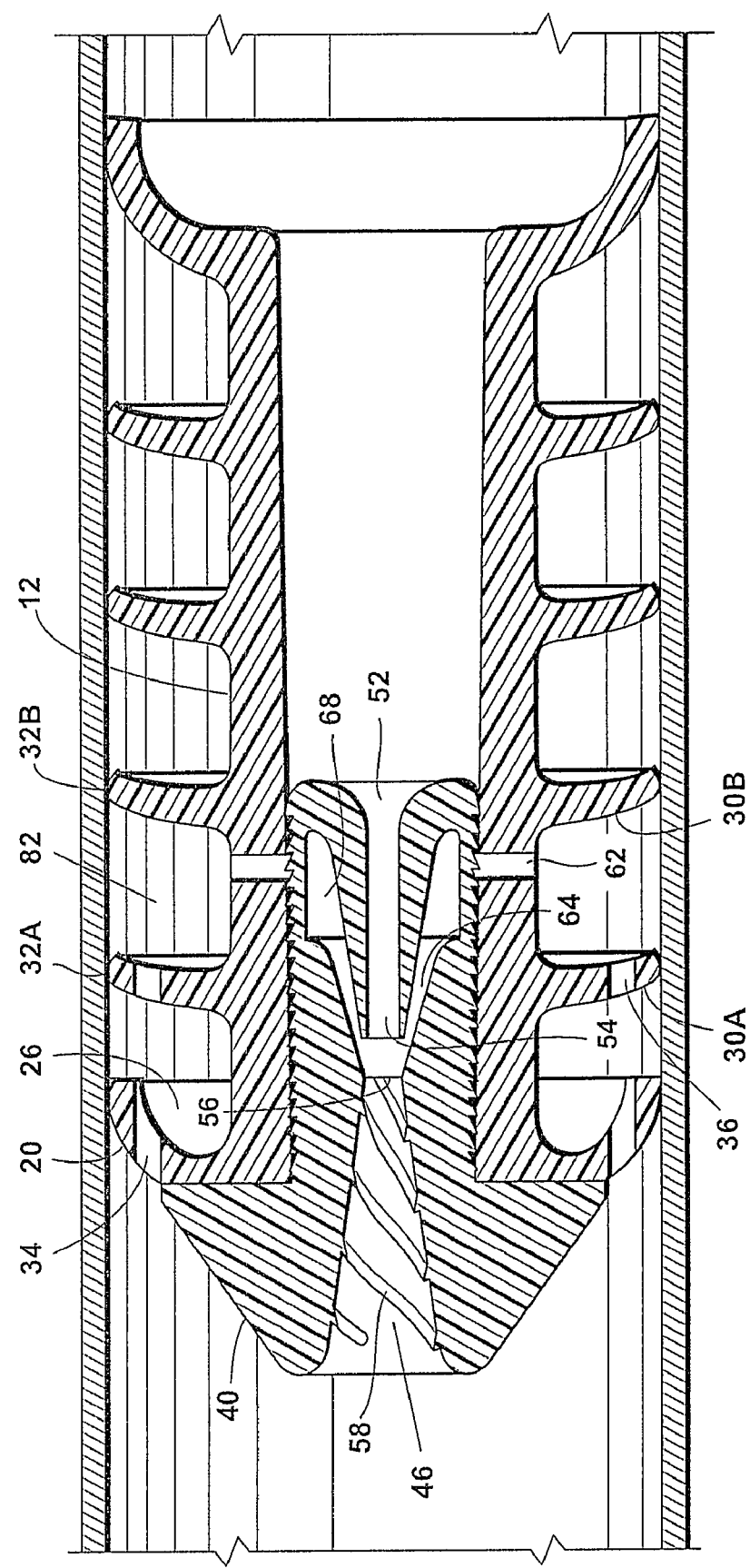
FIG. 7 is a cross sectional view of the pipeline pig of FIG. 5 with a single-piece nozzle having helical louvers.

Forward cup 20 and radial disc seal 30a are each perforated and spaced equally apart, as illustrated in FIGS. 1, 5, and 7. The size and number of perforations 34, 36 in forward cup 20 and in radial disc seal 30a, respectively, is determined by such factors as pipeline size, pressure, and flow availability. Additionally, other configurations of pig 10 may be employed, for example, a pig 10 having a multi-segment nozzle. Regardless of the pig configuration used, the relative arrangement of the porting, passages, and cavities would remain similar to those illustrated herein.

In an application of the Bernoulli effect, the high velocity of pipeline product passing through venturi 56 creates a low pressure at the array of ports 64 that is recognized in space 68 through passageway 62 and cavities 80 and 82. Forward cup 20 and radial disc seal 30a allow vapor V and liquid L in front of the pig 10 to be drawn into cavities 80 and 82, through ports 62, and back into the discharge side of venturi 56. In this manner, liquid L subsisting at a bottom portion of pipeline P is dispersed to achieve a complete 360° coating application of the interior cylindrical wall of pipeline P. Forward cup 20 and radial disc seal 30a may also be perforated (e.g., perforation 34, 36) in a notched-shape (not shown) along the outer portion of their respective circumferential edge, but this type of perforation does not provide as great a degree of control over vacuum in the low pressure plenum area, cavities 80 and 82, as does the more precise drill-size perforation of FIG. 2.

Figure 4:
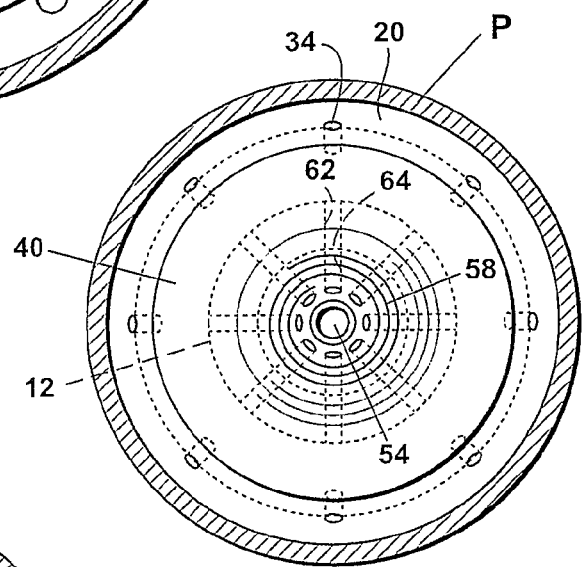
FIG. 4 is a view of the pipeline pig of FIG. 3 taken along section line 4-4.
Figure 3:
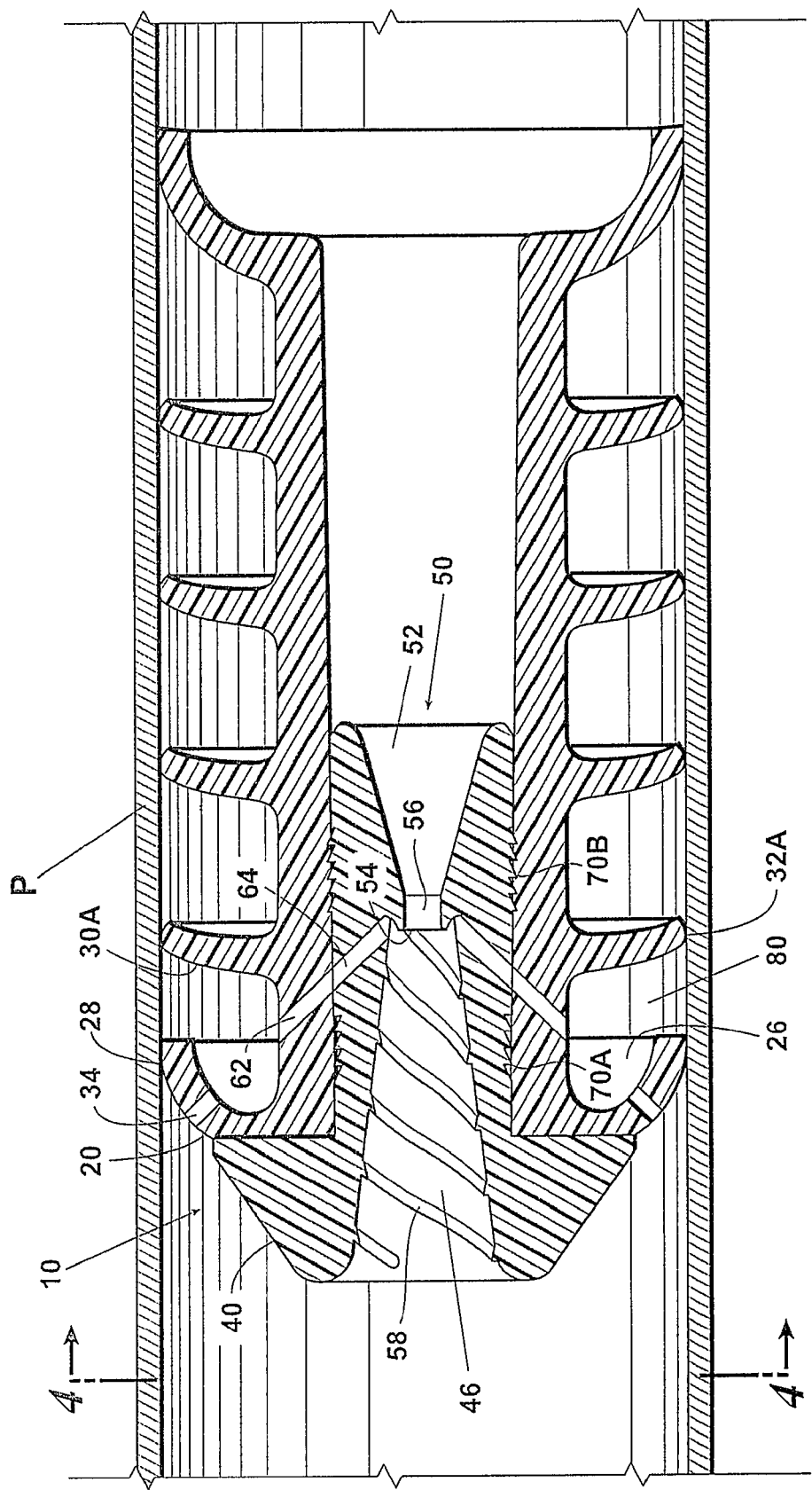
FIG. 3 is a cross-sectional view of the pipeline pig having the array of ports arranged circumferentially around a nozzle with helical louvers and located forward of the venturi, and having a single, perforated sealing element and a low pressure plenum.

FIGS. 3 and 4 illustrate another embodiment of pig 10. In this embodiment, only forward cup 20 is perforated. Passageway 64 angles forward and away from centerline 90, as does passageway 62. Passageway 64 and passageway 62 share a common centerline and communicate low pressure created by venturi 56 to cavity 80. Cavity 80 serves as the low pressure plenum.

Figure 6:
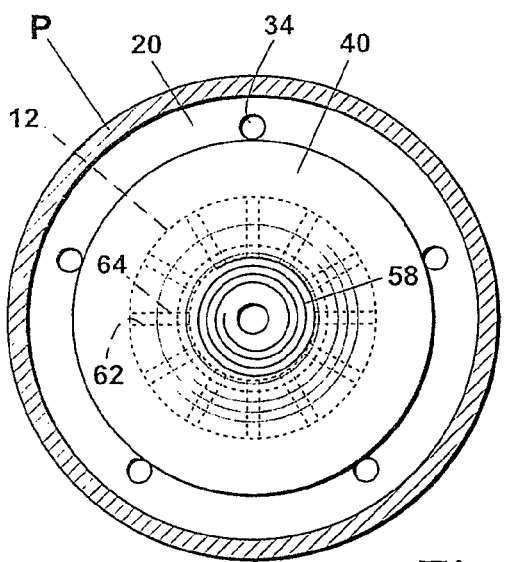
FIG. 6 is a view of the pipeline pig of FIG. 5 taken along section line 5-5.

FIGS. 5, 6, and 7 illustrate yet another embodiment of pig 10. The difference between the embodiment illustrated by FIG. 5 and that illustrated by FIG. 7 is nozzle 40. Nozzle 40 is a two-piece nozzle in FIG. 5 and a single-piece nozzle in FIG. 7. In both embodiments, forward cup 20 and radial disc seal 30a are perforated (perforations 34, 36), but the array of ports 62 is located rearward of venturi 56. Cavities 64 and 68 are in communication with one another and serve as a primary low pressure plenum. Venturi 56 is formed by nozzle 40 as it tapers rearward to a reduced diameter and then increases in diameter. The conical shape of inlet 52 is formed by an insert 60 that is received and held in place by a plurality of barbs 72 that grip the inner surface of pig body 12. Altering the distance between insert 60 and venturi 56 works to adjust the diameter of orifice-to-venturi area and the distance that area transcends from venturi 56.

While the invention has been described with a certain degree of particularity, many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the fall range of equivalency to which each element thereof is entitled.

What is claimed is:

1. A pipeline pig for dispersing liquid onto interior surfaces of a pipeline comprising:
    a longitudinal pig body having a nozzle at a forward end thereof, three or more external circumferential sealing elements, and a circumferential array of ports;
    said nozzle having a conical-shaped central opening and a venturi and sharing a common longitudinal centerline with said pig body;
    said first and second sealing elements each being located rearward of a forward portion of said nozzle and each being perforated to provide two or more passageways through the sealing element;
    wherein said two or more passageways comprises a first passageway and a second passageway;
    said first passageway being in communication with an upper interior quadrant of a pipeline and said second passageway being in communication with a lower interior quadrant of the pipeline; and
    said array of ports being in communication with an interior portion of said nozzle and a low pressure plenum.

2. A pipeline pig according to claim 1 wherein said low pressure plenum is defined by an exterior surface of said pig body, an interior surface of the pipeline, and opposing surfaces of said second and third sealing elements.

3. A pipeline pig according to claim 1 further comprising a circumferential space located between said interior surface of said pig body and an exterior surface of said nozzle, said circumferential space being in communication with said low pressure plenum.

4. A pipeline pig according to claim 1 wherein said array of ports comprises two or more substantially equally spaced passageways.

5. A pipeline pig according to claim 1 wherein a portion of at least one port in said array of ports is located forward of said venturi.

6. A pipeline pig according to claim 1 wherein a portion of at least one port in said array of ports is located rearward of said venturi.

7. A pipeline pig according to claim 1 wherein a portion of at least one port in said array of ports is oriented perpendicular to a centerline of said nozzle.

8. A pipeline pig according to claim 1 wherein a portion of at least one port in said array of ports is oriented at an acute angle relative to a centerline of said nozzle and angled away from the centerline and rearward in relation to said nozzle.

9. A pipeline pig according to claim 1 wherein a portion of at least one port in said array of ports is oriented at an obtuse angle relative to a centerline of said nozzle and angled away from the centerline and forward in relation to said nozzle.

10. A pipeline pig according to claim 1 wherein said nozzle further comprises a plurality of louvers being arranged circumferentially about a centerline of said nozzle.

11. A pipeline pig according to claim 10 wherein a portion of said plurality of louvers is located forward of a discharge side of said nozzle.

12. A pipeline pig according to claim 10 wherein said plurality of louvers is helical-shaped.

13. A pipeline pig according to claim 1 wherein at least one of said first and second sealing elements is perforated through an interior surface.

14. A pipeline pig according to claim 1 wherein at least one of said first and second sealing elements is perforated along a circumferential edge.

15. A pipeline pig according to claim 1 wherein only said first sealing element is perforated, said low pressure plenum being defined by an exterior surface of said pig body, an interior surface of the pipeline, and opposing surfaces of said first and second sealing elements.

16. A pipeline pig according to claim 1 wherein said nozzle further comprises an insert having a conical shape.

17. A pipeline pig according to claim 1 wherein said nozzle further comprises one or more internal cavities, said cavity being in communication with said low pressure plenum.

\* \* \* \* \*